United States Patent
Lee et al.

(10) Patent No.: US 9,208,318 B2
(45) Date of Patent: Dec. 8, 2015

(54) METHOD AND SYSTEM FOR DEVICE INTEGRITY AUTHENTICATION

(75) Inventors: Sung Lee, Palo Alto, CA (US); Alvaro A. Cardenas, Sunnyvale, CA (US); Ryusuke Masuoka, San Jose, CA (US)

(73) Assignee: Fujitsu Limited, Kawasaki-shi (JP)

( * ) Notice: Subject to any disclaimer, the term of this patent is extended or adjusted under 35 U.S.C. 154(b) by 715 days.

(21) Appl. No.: 12/860,247

(22) Filed: Aug. 20, 2010

(65) Prior Publication Data

US 2012/0047550 A1 Feb. 23, 2012

(51) Int. Cl.
*G06F 1/26* (2006.01)
*G06F 21/57* (2013.01)
*H04L 29/06* (2006.01)

(52) U.S. Cl.
CPC .............. *G06F 21/57* (2013.01); *H04L 63/126* (2013.01); *Y04S 40/24* (2013.01)

(58) Field of Classification Search
USPC ................................ 713/189–192; 726/34–36
See application file for complete search history.

(56) References Cited

U.S. PATENT DOCUMENTS

| | | | |
|---|---|---|---|
| 6,925,566 B1 | 8/2005 | Feigen et al. | |
| 7,194,623 B1 | 3/2007 | Proudler et al. | |
| 7,437,568 B2 | 10/2008 | Das-Purkayastha et al. | |
| 7,437,763 B2 | 10/2008 | Guo | |
| 8,037,306 B2 | 10/2011 | Wei et al. | |
| 8,131,997 B2 | 3/2012 | Chang et al. | |
| 8,161,552 B1 * | 4/2012 | Sun et al. | 726/22 |
| 8,171,295 B2 | 5/2012 | Munetoh et al. | |
| 8,219,496 B2 | 7/2012 | Pearson et al. | |
| 8,255,977 B2 | 8/2012 | Xiao et al. | |
| 8,271,780 B2 | 9/2012 | Xiao et al. | |
| 8,490,179 B2 | 7/2013 | Proudler | |
| 8,510,805 B2 | 8/2013 | Zhang et al. | |
| 8,560,857 B2 | 10/2013 | Munetoh et al. | |
| 2002/0083341 A1 * | 6/2002 | Feuerstein et al. | 713/201 |
| 2003/0009687 A1 * | 1/2003 | Ferchau et al. | 713/200 |
| 2004/0003288 A1 | 1/2004 | Wiseman et al. | |
| 2004/0177270 A1 | 9/2004 | Little et al. | |
| 2005/0086511 A1 | 4/2005 | Balacheff et al. | |
| 2006/0190606 A1 | 8/2006 | Kohavi | |
| 2007/0143629 A1 * | 6/2007 | Hardjono et al. | 713/189 |
| 2007/0239748 A1 | 10/2007 | Smith | |
| 2008/0046758 A1 | 2/2008 | Cha et al. | |

(Continued)

FOREIGN PATENT DOCUMENTS

| | | | |
|---|---|---|---|
| EP | 1030237 | 2/1999 | |
| JP | 2004-355450 A | 12/2004 | G06F 15/00 |

(Continued)

OTHER PUBLICATIONS

Xi et al., "An integrity measurement model for embedded system-based trusted computing platform," Advanced Computer Theory and Engineering (ICACTE), 2010 3rd International Conference on 2010, pp. V1-179-V1-183.*

(Continued)

*Primary Examiner* — Roderick Tolentino
(74) *Attorney, Agent, or Firm* — Baker Botts L.L.P.

(57) ABSTRACT

A networked device performs integrity authentication by determining, using a processor, a measured integrity value of the device. The measured integrity value is compared by the processor to an embedded integrity value of the device. Application of a policy to the device is facilitated by the processor based on the comparison.

24 Claims, 4 Drawing Sheets

FIG. 2

(56) References Cited

U.S. PATENT DOCUMENTS

| | | | |
|---|---|---|---|
| 2008/0244758 A1 | 10/2008 | Sahita et al. | |
| 2008/0250501 A1* | 10/2008 | Wei et al. | 726/23 |
| 2008/0301441 A1* | 12/2008 | Calman et al. | 713/168 |
| 2009/0049510 A1 | 2/2009 | Zhang et al. | |
| 2009/0055918 A1 | 2/2009 | Chang et al. | |
| 2009/0165081 A1* | 6/2009 | Zhang et al. | 726/1 |
| 2009/0271844 A1 | 10/2009 | Zhang et al. | |
| 2010/0005289 A1* | 1/2010 | Devanand et al. | 713/155 |
| 2010/0062808 A1* | 3/2010 | Cha et al. | 455/558 |
| 2010/0070800 A1* | 3/2010 | Hanna | 714/6 |
| 2010/0318781 A1* | 12/2010 | Nicolson et al. | 713/2 |
| 2011/0131627 A1 | 6/2011 | Abendroth et al. | |
| 2011/0154059 A1* | 6/2011 | Durham et al. | 713/190 |
| 2012/0005718 A1 | 1/2012 | Xiao et al. | |
| 2012/0311315 A1 | 12/2012 | Ekberg et al. | |

FOREIGN PATENT DOCUMENTS

| | | | | |
|---|---|---|---|---|
| JP | 2005-180966 A | 7/2005 | | G01R 22/00 |
| JP | 2007-052550 A | 3/2007 | | G06F 21/20 |
| WO | WO2008/024135 | 8/2006 | | |

OTHER PUBLICATIONS

Hou et al., "Data privacy and integrity appropriate for disk protection," Computer and Information Technology, 2008. CIT 2008. 8th IEEE International Conference on 2008, pp. 414-419.*

Office Action from Great Britain Patent Office, GB1113026.7, dated Nov. 2, 2011 2 pages.

UK Intellectual Property Office Search Report, 4 pages, Dec. 13, 2011.

USPTO Office Action for U.S. Appl. No. 12/947,662 to Sung Lee, et al. dated Sep. 27, 2012, 12 pages.

USPPTO Office Action for U.S. Appl. No. 12/947,687 to Sung Lee, et al dated Aug. 2, 2012, 22 pages.

USPTO Office Action for U.S. Appl. No. 12/947,687 to Sung Lee, et al dated Aug. 2, 2012, 22 pages, Dec. 14, 2012.

USPTO Office Action for U.S. Appl. No. 12/947,687 to Sung Lee, et al dated Aug. 2, 2012, 22 pages, Apr. 23, 2013.

Dzolkhifli, et al., "A Framework for Caching Relevant Data Items for Checking Integrity Constraintsof Mobile Database" pp. 476-482 2008 IEEE.

USPTO Office Action for U.S. Appl. No. 12/947,662 to Sung Lee, et al dated Aug. 2, 2012, 13 pages, Apr. 11, 2013.

USPTO Office Action for U.S. Appl. No. 12/947,687 to Sung Lee, et al dated Jan. 27, 2014, 23 pages.

USPTO Office Action for U.S. Appl. No. 12/947,687 to Sung Lee, et al filed Nov. 16, 2010, 26 pages, Aug. 22, 2013.

USPTO Office Action for U.S. Appl. No. 12/947,662 to Sung Lee, et al. filed Nov. 16, 2010, 15 pages, Dec. 11, 2013.

USPTO Office Action for U.S. Appl. No. 12/947,687 to Sung Lee, et al dated May 27, 2014, 23 pages.

USPTO Final Office Action for U.S. Appl. No. 12/947,662 to Sung Lee, et al. dated Jun. 30, 2014, 18 pages.

Japanese Office Action issued in Patent Appl. No. 2011-179521; 4 pages w/ English translation, Jan. 6, 2015.

* cited by examiner

METHOD AND SYSTEM FOR DEVICE INTEGRITY AUTHENTICATION

TECHNICAL FIELD

This invention relates in general to networked devices and more particularly to a method and system for device integrity authentication.

BACKGROUND

Efforts have increased to modernize the nation's aging electrical grid in order to be ready for next generation usage. This modernization has brought digitization to the electric grid with many industrial control components being networked and remotely controlled. However, the details of how these components interconnect and communicate have remained proprietary. With the modernization, more and more devices are added to the network and implemented with open standards and technology. An example of a component being networked is a smart meter deployed at a customer's premises that provides meter readings of electrical usage. The smart meters may be deployed with limited protection or inadequate security measures. Some smart meters may be equipped with tamper detection mechanisms that can detect when the meter is opened or moved. In response thereto, the meter may shutdown or send an alert signal. In many implementations, smart meters send critical data from one meter to another. If one meter in the network is compromised, this critical data can be used to adversely affect system operation for illicit gain. Current smart meters have no capability to detect an attack remotely, by insiders, or zero-day attacks that may affect the software executing in the smart meter.

SUMMARY OF THE DISCLOSURE

From the foregoing, it may be appreciated by those skilled in the art that a need has arisen to detect errors in devices and protect networked devices from remote software tampering or inside attacks. In accordance with the present invention, there is provided a method and system for device integrity authentication that may substantially eliminate or greatly reduce disadvantages and problems associated with conventional device security in a network.

According to one embodiment of the present invention, a method for device integrity authentication is provided includes determining, using a processor, a measured integrity value of a device. The measured integrity value of the device is compared by the processor to an embedded integrity value of the device. Application of a policy to the device is facilitated by the processor based on the comparison.

Certain embodiments of the invention may provide one or more technical advantages. An example of a technical advantage of one embodiment is to have a device perform a self check to determine its integrity. Another technical advantage is to apply a policy to the device based on the results of the integrity authentication.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and for further features and advantages thereof, reference is now made to the following description taken in conjunction with the accompanying drawings, wherein like reference numerals represent like parts, in which.

DETAILED DESCRIPTION OF EXAMPLE EMBODIMENTS

Figure 1:
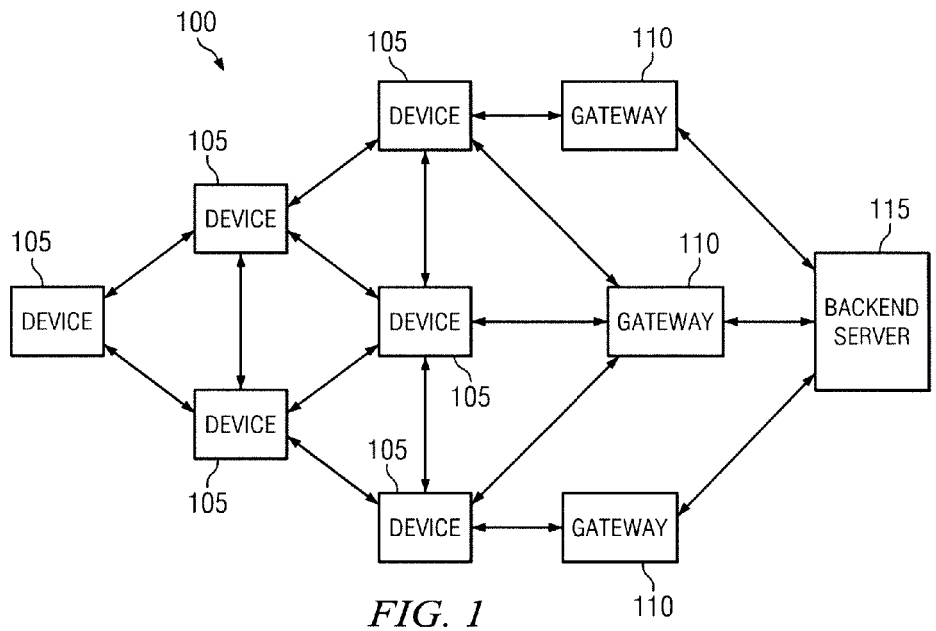
FIG. 1 illustrates an example embodiment of a system with networked devices.

FIG. 1 illustrates an embodiment of a system 100 operable to facilitate the application of a policy to one or more devices 105. In this embodiment, the system 100 includes a network comprising devices 105, gateways 110, and a backend server 115. Devices 105 may be operable to communicate with one another and to the gateways 110. Devices 105, in certain embodiments, may communicate directly with the backend server 115 or through a gateway 110. As will be described in more detail in the following figures, under various circumstances, a device 105 may take certain actions in accordance with a policy. Device 105 may store the policy within local storage, or, alternatively, an outside source may communicate the policy to device 105. For example, the policy may come from other devices 105, from backend server 115 via gateway 110 and/or other devices 105, or from backend server 115 directly.

Devices 105, gateways 110, and backend server 115 may be coupled to any suitable communication network. A communication network may comprise all or a portion of one or more of the following: a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, other suitable communication link, or any combination of any of the preceding. For example, in certain embodiments, gateways 110 may be connected by fiber backbone to backend server 115. Additionally, devices 105 may comprise radio transmitters operable to transmit data from a device 105 wirelessly to other devices 105, gateways 110, and backend server 115.

In particular embodiments of system 100, devices 105 may operate as smart meters operable to measure electricity usage for customers of an electric utility. When devices 105 act as smart meters, they may form a mesh network in which management data, control data, and meter data are transmitted from device to device with each device serving as a relay node. In these embodiments, backend server 115 may be located at an electric utility company. Meter data may comprise information about the electric usage at a particular customer's premises. Control data may comprise data associated with controlling particular components on one or more devices 105. Management data may comprise data associated with forming and maintaining the network. For example, management data could indicate the route that data from a particular device 105 would take in order to reach backend server 115.

If a device or node in a smart meter network is compromised, the data sent from a node also may be compromised such that it may be used for various illicit purposes. For example, management data may be used to disturb the routing capability of the network. Control data may be used to remotely connect or disconnect power. Meter data may be used to falsely report electricity usage for economical gain. As described more fully in the description for the figures that follow, a policy may be associated with these different types of data, which may help to reduce the transmission of compromised data and/or reduce the impact that compromised data may have on the other components in the network. The components of system 100 may communicate with each other using various encryption and key management techniques.

In other embodiments, devices 105 may be any of a range of devices. For example, in addition to smart meters, the devices 105 could comprise several of the other components of a smart electricity grid. More broadly speaking, the devices 105 may comprise one or more components of any supervisory control and data acquisition (SCADA) or industrial control system. In other embodiments, the devices 105 may be any device deployed on a home area network (HAN). One having ordinary skill in the art will appreciate that devices 105 may be employed in a comparatively small network such as a HAN or deployed as a large scale network, such as an electric grid deployed over a neighborhood or city.

Figure 2:
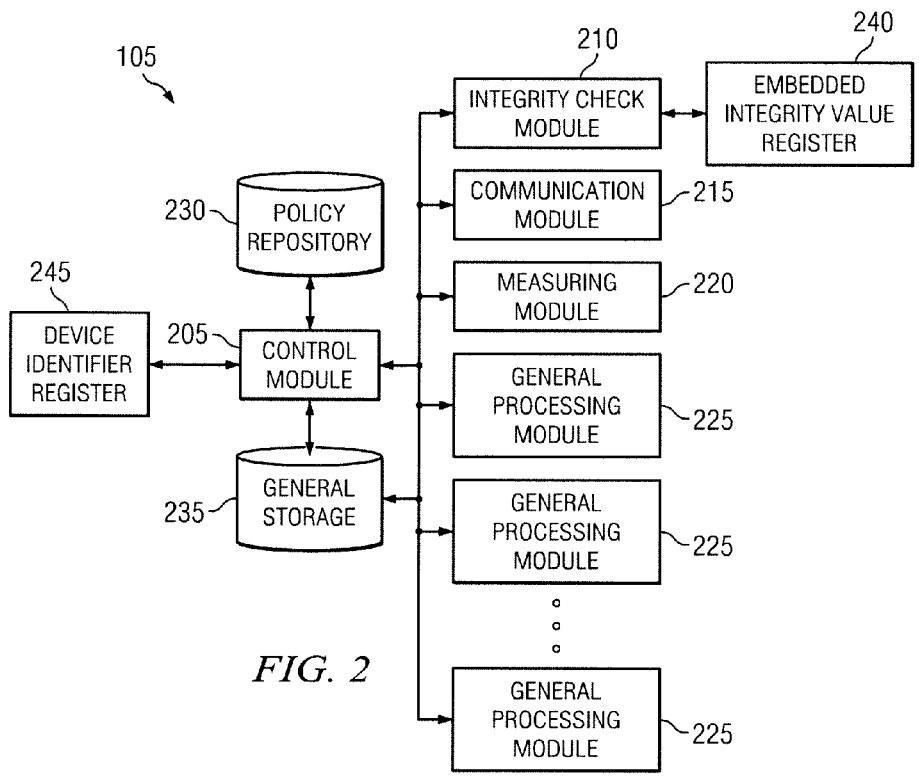
FIG. 2 illustrates an example embodiment of a device in the network.

FIG. 2 illustrates an embodiment of a device 105 operable to facilitate application of a policy. In certain embodiments, device 105 may include a control processing module 205, which may have general control over the operations and features of device 105. Control processing module 205 may be coupled to several processing modules operable to perform different functions of device 105 such as integrity check processing module 210, communication processing module 215, measuring processing module 220, and other general processing modules 225. These processing modules may perform various functions. In some embodiments, control processing module 205 also may be coupled to a policy repository 230, a general storage 235, and/or a device identifier register 245. Policy repository 230 may contain policies to be applied to device 105 under certain conditions. General storage 235 may comprise a storage unit generally accessible by control processing module 205 and the other processing modules included on device 105. Device identifier register 245 may be configurable to contain the value of an identifier of device 105.

Communication processing module 215, measuring processing module 220, and general processing modules 225 may perform a wide range of functions. In certain embodiments, communication processing module 215 may operate to transmit or receive communications from other devices 105, gateways 110, backend server 115, or any other external source. It also may operate to assist in determining the route a certain communication will take to get to a specific destination. For example, it may determine which other devices 105 to communicate with in order for a transmission of data to get to a particular other device 105, a particular gateway 110, or backend server 115. In embodiments where device 105 is an electric smart meter, measuring processing module 220 may measure electricity usage for an electricity user's premises. General processing modules 225 may perform any of a number functions such as measuring ambient environment factors proximate to device 105, testing of various elements of device 105, and maintaining an appropriate temperature for device 105. Communication processing module 215, measuring processing module 220, and general processing modules 225 may operate under the direction of control processing module 205 according to a policy stored in policy repository 230.

In embodiments that include device identifier register 245, an identifier of device 105 may be used to determine what policy should apply to device 105 as described in more detail below. As non-limiting examples, an identifier may comprise a Media Access Control (MAC) address or an (Internet Protocol) IP address. The identifier may be hardwired or hard-coded into device identifier register 245 at run-time, or alternatively may be updatable after deployment of device 105. An identifier may be unique in the sense that it uniquely identifies a particular device 105 in a plurality of devices 105. Alternatively, the identifier contained within device identifier register 245 of a particular device 105 may be the same as an identifier for one or more other devices 105. This may happen, for example, in a city with many neighborhoods. The devices common to a particular neighborhood may share a common identifier. Certain embodiments of device 105 may include none, one, two, or more device identifier registers 245. They may be configured to contain any combination of the types of identifiers discussed herein.

In certain embodiments, device identifier register 245 may be in a protected section of device 105, such that device identifier register 245 is more difficult to modify once device 105 is deployed in the field. The protected section of device 105 could be configured in hardware, software, or firmware. For example, device identifier register 245 may be a part of read-only memory or computed from a program configured to be non-modifiable.

An embedded integrity value register 240 may store a value which can be accessed by integrity check processing module 210 when performing its integrity check, as further described below. The value stored in embedded integrity value register 240 may be programmed at the time of the manufacture of device 105. Alternatively, it may be programmed at some later time, for example, in response to a system wide upgrade. Embedded integrity value register 240 may be a part of a protected section of the device 105 in a similar fashion as that described above for device identifier register 245. In some embodiments, device 105 may employ multiple embedded integrity value registers 240. In certain of these embodiments, the embedded integrity value registers may employ various formats, such as hardware, firmware, or software. This approach may allow redundancy in the integrity checking feature of integrity check processing module 210 as further described below.

In certain embodiments, integrity check processing module 210 may be operable to perform an integrity check by determining a measured integrity value of the device 105 and comparing it to the embedded integrity value stored in embedded integrity value register 240. Integrity check processing module 210 may determine the measured integrity value of the device 105 by aggregating one or more sector values of other processing modules and/or software modules on the device 105. Sector values may come from designated registers, memory blocks, code blocks, or any other component of a module. Integrity check processing module 210 may determine the sector values of communication processing module 215, measuring processing module 220, and one or more of the general processing modules 225. The integrity check processing module 210 may then add the sector values of these processing modules such that the measured integrity value is the sum of these sector values. In other embodiments, the integrity check processing module 210 may calculate a checksum based on the sector values of one or more predetermined processing modules.

Integrity check processing module 210 may determine the measured integrity value using any of a number of formulas while remaining within the scope of the present disclosure. In certain embodiments, the formulas may be a function of other factors in addition to the sector values, such as the time of day, the date, the amplitude of ambient light around the device, the ambient temperature around the device, proximity to a gateway 110 or backend server 115, and/or the amount of meter usage in the case where device 105 is a smart meter. In certain of these embodiments, the value stored in the embedded value register may change depending on the values of these other factors in accordance with the formula. The use of varying formulas when performing the integrity check may reduce the risk of compromises to device 105 from nefarious third-parties.

In certain embodiments employing multiple embedded integrity value registers 240, the integrity check processing module 210 may be programmed to compare the measured integrity value against an aggregate of each of the embedded integrity value registers 240. Alternatively, integrity check processing module 210 may compare the measured integrity value against an aggregate of a subset of the integrity value registers 240. In some embodiments, integrity check processing module 210 may be configured to compute multiple measured integrity values. Integrity check processing module 210 may compare one or more measured integrity values to one or more of the embedded integrity values. Integrity check processing module 210 may report the results of the multiple comparisons to control processing module 205. A policy stored in policy repository may provide instructions depending on the results of the comparison as further described below.

In certain embodiments, integrity check processing module 210 may store intermediate measured values in addition to the measured integrity value discussed above, which may also be called a final measured integrity value or hash value. These intermediate values may be based on a subset of the sector values used to determine the final measured integrity value. For example, a first intermediate value may be based on the sector values of the communication processing module 215 and the measuring processing module 220. A second intermediate value may be based on the sector values of communication processing module 215, measuring processing module 220, and one of general processing modules 225. In certain embodiments, the first intermediate value may be the sum of the sector values of communication processing module 215 and measuring processing module 220. The second intermediate value may be a mathematical value, including for example a sum or exclusive OR (XOR), of the sector values of communication processing module 215, measuring processing module 220, and the one of general processing modules 225. Integrity check processing module 210 may store these intermediate values in general storage 235. Control processing module 205 may access these values from general storage 205 in accordance with a policy stored in policy repository 230.

Integrity check processing module 210 may be implemented with Trusted Platform Module (TPM) from Trusted Computing Group in certain embodiments. TPM relies on an open, international standard, which may ease integration efforts with other processing modules present on device 105.

Integrity check processing module 210 may report the result of the comparison of the measured integrity value to the value in embedded integrity value register 240 to control processing module 205. Control processing module 205 may operate to apply one or more policies in policy repository 230 based on the results of an integrity check performed by integrity check processing module 210. Policy repository 230 may be a part of a protected section of the device 105 in a fashion similar to that described above for device identifier register 245. The level of protection for policy repository 230 may make the individual policies more tamper-proof under certain circumstances.

Depending on the results of the comparison, the policy may instruct control processing module 205 to modify the operable features of one or more processing modules of device 105. In certain embodiments, if the values do not match, the policy may instruct the control processing module 205 to disable one or more processing modules on the device 105. For example, the control processing module 205 may disable or otherwise restrict the features of communication processing module 215, the measuring processing module 220, or one or more of the general processing modules 225. In normal operation the communication processing module 215 may be operable with a full feature set such that it can communicate with any other device 105 and communicate any type of data to any other device 105. In the instance that the measured integrity value does not match the embedded integrity value, the control processing module 205, according to the policy, may completely disable the features of communication processing module 215 or limit its communication features to communicating certain data types. In certain embodiments, the communication processing module 215 may be permitted to transmit metering data, but not allowed to transmit either management data or control data. In other embodiments, the policy may direct control processing module 205 to disable the entire device 105.

In certain embodiments, the default or normal policy of device 105 may provide that certain processing modules of device 105 are disabled. If an enabled processing module of device 105 or an outside actor (such as another device 105) request functions performed by a normally disabled processing module of device 105, the policy may require device 105 to perform an integrity check with integrity check processing module 210. In some embodiments, the control processing module 205 may enable the normally disabled processing module if the integrity check results in a match in accordance with the description described above. One of skill in the art will recognize that a policy may instruct control processing module 205 to begin, cease, or maintain a level of functionality of various processing modules of device 105 according to the results of an integrity check by integrity check processing module 210.

In the event that a final measured integrity value does not match the embedded integrity value, a policy stored in policy repository 230 may instruct the control processing module 205 to retrieve one or more of the intermediate values which may be stored in general storage 235. A policy stored in policy repository 230 may have different provisions depending on certain of the intermediate values. For example, depending on one or more of the intermediate values, the policy may instruct control processing module 205 to disable only one of the processing modules on device 105. Following this example, it may instruct control processing module 205 to disable one of the general processing modules 225 while leaving other general processing modules 225 and communication processing module 215 to maintain their present functionality. As is the case with a final measured integrity value, certain intermediate values may be expected. Certain intermediate values depend directly on sector values of certain processing modules. The policy may instruct the control processing module 205 to disable the processing module corresponding to the sector value, which, when aggregated with the measured integrity value, yielded the improper result.

In certain embodiments, integrity check processing module 210 may report the result of multiple comparisons if, for example, device 105 includes multiple embedded integrity value registers 240. In embodiments with multiple embedded integrity value registers 240, the policy stored in policy repository 230 may provide various options depending on how many of the comparisons fail to match. For example, in a device 105 employing three embedded integrity value registers 240, the policy may allow continued functionality if one or two comparisons match successfully while the remaining comparison or comparisons result in a non-match. For each of these comparisons, one or more intermediate values may have been determined according to the procedure described above. Integrity check processing module 210 may store one or more of the determined intermediate values for each of the comparison in general storage 235 for later access by control processing module 205. Control processing module 205 may access one or more of the intermediate values if, for example, a measured integrity value does not match the value stored in an embedded integrity value register 240.

In certain embodiments, a policy stored in policy repository 230 may instruct control processing module 205 to allow communication processing module 215 to attempt to contact backend server 115 if the integrity check fails. Backend server 115 may then determine the policy to apply to device 105. To assist backend server 115 in determining what functions the device 105 should be allowed to perform, device 105 may transmit certain information to backend server 115. This information may comprise several items including the measured integrity value, the value stored in device identifier register 245, any intermediate measured values, and/or any other information suitable to assist backend server to determine a policy to apply to device 105. Based on this information, backend server 115 may transmit a policy for device 105 to apply. This policy, similar to the policy that may be stored in policy repository 230, may instruct control processing module 205 to allow the processing modules 215, 220, and/or 225 to begin, cease, or maintain their current functions. Backend sever 115, in certain embodiments, may transmit a policy that instructs control processing module 205 to disable device 105 completely. In certain embodiments, backend server 115 may automatically dispatch a technician to the location of device 105 for on-site troubleshooting.

Backend server 115, in some embodiments, may use an identifier transmitted by device 105 in determining a policy for device 105 to apply. For example, if backend server determines from the identifier that device 105 is located such that it is relied on heavily for communication routes by other devices 105, it may transmit a policy that instructs device 105 to maintain a full level of functionality for its communication processing module 215. In another example, backend server 115 provides an instruction to shut down its communication processing module 215 if other suitable communication nodes are nearby.

Figure 3:
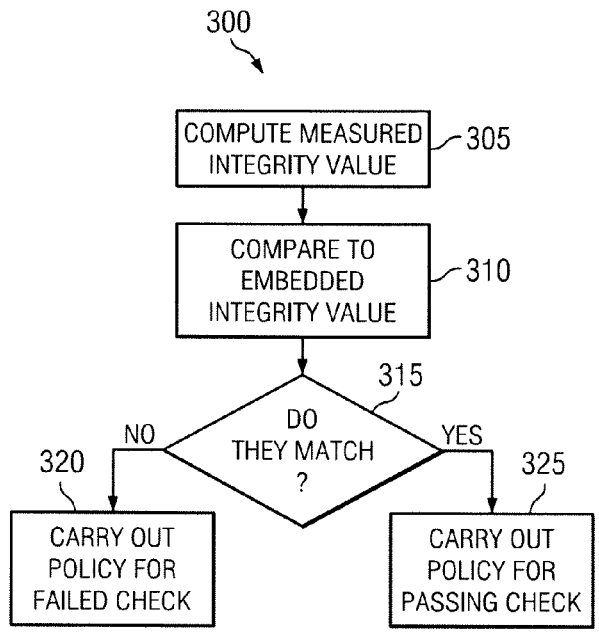
FIG. 3 illustrates an example embodiment of a method for performing an integrity check within the device.

FIG. 3 illustrates an embodiment of a method 300 operable to initiate an integrity check and facilitate application of a policy in accordance with the results of that integrity check. The method begins at step 305 where the integrity check processing module of a device 105 computes the measured integrity value for device 105. An embodiment of step 305 is more fully described during the discussion of FIG. 4. At step 310, the embedded integrity value is compared to the measured integrity value of the device 105. At step 315 a determination is made as to whether the embedded integrity value matches the measured integrity value. If the values match, then the method carries out the policy for a passed integrity check at step 325. This policy may comprise enabling and/or not disabling one or more features of one or more processing modules of device 105.

If the values do not match in step 315, the method then carries out the policy for a failed integrity check at step 320. This policy may comprise disabling and/or not enabling one or more features of one or more processing modules of device 105. The policy may comprise accessing any intermediate values that may be stored in general storage 235. The policy may provide for disabling and/or not enabling one or more features of specific processing modules depending on these intermediate values. For example, if a certain intermediate value is not as expected, then the policy may provide for disabling and/or not enabling one or more features of the specific processing module corresponding to the unexpected intermediate value. The policy may also comprise contacting a backend server 115, sending the backend server 115 certain information, and receiving instruction in the form of a second policy from the backend server 115. The second policy may be based on the information sent. The determination as to which policy is to be applied may depend on one or more differences between the measured integrity value and the embedded integrity value.

Other embodiments of the method 300 may comprise steps associated with multiple embedded integrity values and/or multiple measured integrity values. In these embodiments, the method may include steps directed to applying a policy that makes use of these multiple values. For example, where multiple comparisons take place the policy may favor certain comparisons over other comparisons in the event that all checks do not pass. Following this example, the policy may provide for disabling and/or not enabling one or more features of a processing module when two out of three of the comparisons fail. In some embodiments, the policy may depend on the type of embedded integrity value register (e.g., hardware, software, or firmware) that yielded a failed comparison.

Method 300 may also include a step for storing the measured integrity value in a storage unit such as general storage 235. The measured integrity value may also be stored in secure storage located on a device (which may be a part of integrity check processing module 210 itself). The measured integrity value may be accessed in response to a subsequent request for an integrity check. A policy may be carried out at a later time in response to the comparison. Measuring the integrity value ahead of time, storing the measured integrity value, and subsequently, in response to an integrity check request, carrying out a policy in accordance with the results of the comparison may reduce processing latency. For example, if the measured integrity value has already been determined, then the time it takes to respond to an integrity check request may exclude some of the time it takes to perform the measurement. This may help to reduce processing time.

In certain embodiments, a device may be programmed to perform method 300 when the device is booted up. The device may apply a policy automatically in response to the comparison or store its measured integrity value in storage. It may then apply a policy in accordance with the results of its comparison in response to a request for an integrity check. If the measured integrity value is placed in storage for later access, it may be associated with a timeout. After the timeout has passed, the device may be required to compute its measured integrity value again before it determines the result of an integrity check. In certain embodiments, the device may perform method 300 according to a predetermined schedule. For example, the device 105 may be programmed to perform the method 300 at equally spaced time intervals four to six times a day. In other embodiments, the device 105 may be programmed to perform the method 300 during off-peak times, where off-peak times may mean times where network traffic is comparatively lower than other times. In certain embodiments, the device 105 may perform the method 300 in response to a request from outside of the device 105. For example, backend server 115 may initiate a system-wide integrity check for all devices 105 within a system 100.

Figure 4:
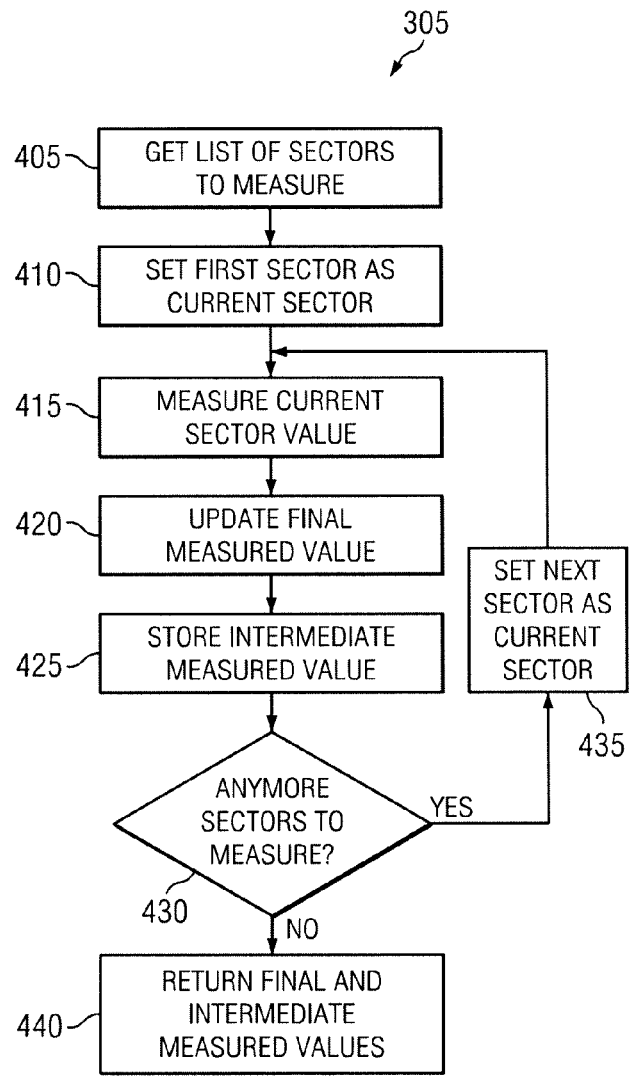
FIG. 4 illustrates an example embodiment of a method for computing a measured integrity value of the device.

FIG. 4 illustrates an example embodiment of method 305 for computing the measured integrity value of a device 105. The method begins at step 405 where the list of sectors to measure in the device 105 is retrieved. A sector may correspond or be a part of a particular processing module of device 105. In some embodiments, the list of sectors may be predetermined and stored in a protected section of device 105. In other embodiments, the predetermined sectors are agreed by the industry (that is, no storage is necessary for the list of sectors to measure but it is programmed to measure certain sectors in a particular order).

At step 410, the first sector in the list retrieved in step 405 is set as the current sector. At step 415, the current sector value is measured. At step 420, the method updates the final measured value of the device 105 based on the current sector value. In embodiments where the measured integrity depends on the sum of sector values, step 420 adds the current sector value to the final measured value. The sum is stored as the final measured value. When the method is complete, the final measured value may be reported back as the measured integrity value of the device 105. Though, a sum operation is described, other mathematical operations (including an XOR operation may be performed in different embodiments).

At step 425, the value stored as the final measured value in step 420 is stored as an intermediate measured value. In some embodiments, this intermediate measured value may be used in the event that the final measured value does not match the embedded integrity value of the device 105. At step 430, a determination is made as to whether there are any more sectors to measure in the list retrieved during step 405. If there are more sectors to measure, then the next sector is set as the current sector at step 435 and the method continues with step 415. At step 430, if there are no more sectors to measure, the method continues with step 440. At step 440, the final measured value is returned as the measured integrity value for the device 105. In certain embodiments, the method 305 may return the intermediate measured values. These can be stored in the general storage of the device 105.

In certain embodiments, method 305 may perform its steps in varying orders and with less or more steps than those provided in FIG. 4. For example, method 305 may aggregate all the sector values without storing any intermediate values. Alternatively, method 305 may store only some of the intermediate values in accordance with a policy that does not have provisions for all intermediate values. In some embodiments, method 305 may perform in parallel all the calculations needed to determine the final measured values and intermediate measured values. These embodiments may not require "looping" but may require more system resources to perform simultaneous calculations. In a TPM context, these values are computed in sequence, not in parallel, as it requires an XOR operation with a previous value.

Figure 5:
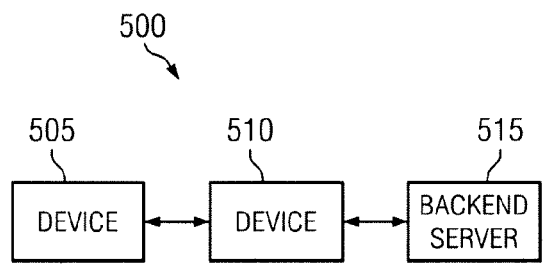
FIG. 5 illustrates an example embodiment of a system with two devices and a backend server.

FIG. 5 illustrates an embodiment of a system 500 operable to facilitate application of a policy to a device. Included in the system are a device 505, a device 510, and a backend server 515. Devices 505 and 510 may have features and components similar to device 105 as depicted in FIG. 2. In certain embodiments, device 505 attempts to communicate to device 510 or to backend server 515 via device 510. Device 505 may attempt to send different types of data including control data, management data, or metering data. Device 505 may also attempt to send diagnostic data to backend server 515 in response to a failed integrity check. Diagnostic data may include a measured integrity value, an identifier, an intermediate measured value, and any other information that may help backend server 515 to determine an appropriate policy for a device that has failed an integrity check. Depending on the type of data, device 505 may have a policy of performing an integrity check on itself before it allows its communication processing module 215 to send the data. If the integrity check fails, device 505 may carry out the policy for a failed integrity check in accordance with method 320. In the instance that the integrity check passes, device 505 may continue its attempt to send data to device 510 and/or backend server 515. In the event that the integrity check fails, device 505 may disable or not enable one or more features. In some embodiments, device 505 may attempt to contact backend server 515 via device 510. Backend server 515 may then send instructions in the form of a policy back to device 505 via device 510.

In certain embodiments, device 510 may receive a request to communicate from device 505 and require device 505 to perform an integrity check. Device 510 may require device 505 to transmit the measured integrity value of device 505 to the device 510. Device 510 may then check the measured integrity value of the device 505 against the embedded integrity value of device 510. In the event that the embedded integrity value of device 510 and the measured integrity value of the device 505 match, device 510 may determine that the device 505 is trustworthy. Device 510 may then allow processing of the data that was sent to device 510 from device 505.

In the event that the embedded integrity value of device 510 and the measured integrity value of device 505 do not match, device 510 may have several options depending on the policy. The policy stored in device 510 may be to determine that device 505 is untrustworthy and reject all communication with device 505. The policy may be for device 510 to request that device 505 perform its integrity check again and transmit the measured integrity value it determined from the second integrity check. The policy may instruct device 510 to request a specified number of subsequent integrity checks. This may help to account for a possibly anomalous measurement of the measured integrity value, which could be corrected by performing another measurement.

Another policy may be to contact backend server 515 for further instruction on how to deal with the incoming communication from device 505. In seeking instruction from backend server 515, device 510 may forward diagnostic data received from device 505 such that backend server 515 may determine the appropriate policy for the device 510 to follow. Device 510 also may forward information about itself, such as an identifier, measured integrity value, etc. The determination as to which policy is to be applied may depend on one or more differences between the measured integrity value of device 505 and the embedded integrity value of device 510. Backend server 515 may have records of the identifiers of the devices deployed in system 500. The policy that backend server 515 determines should apply may depend on an identifier, which may be included in the diagnostic data transmitted by device 505. Backend server 515 may note in its records that device 505 failed an integrity check. It may also schedule additional actions, such as deploying a technician to inspect device 505. The technician may perform many actions, such as repairing, replacing, or removing device 505 in certain cases.

In certain embodiments, the policy (either the one stored on the device 510 or the policy received from the backend server 515) may have different provisions depending on the data type. For example, if device 505 is attempting to send metering data or diagnostic data, then device 510 may allow processing of the data in accordance with its policy without requiring an integrity check of device 505. If the type of data being forwarded from device 505 is control data and/or management data, device 510 may restrict the processing on that data in accordance with its policy. This restriction may include rejecting that type of communication or limiting it to certain types of processing.

In certain embodiments, device 505 may attempt to join an existing network of devices if it detects that such a network exists when it boots up. In the event that no network exists, it may attempt to begin its own network. If device 505 attempts to join an existing network through device 510, then device 510 may require device 505 to perform an integrity check similar to that described in the discussion above.

If admitted to the network, device 505 may require device 510 to submit to an integrity check where device 510 would have to measure its own integrity value and transmit that to device 505. Device 505 would check the measured integrity value of device 510 against the embedded integrity value of device 505. A measured integrity value may be based on sector values, which may be stored in less protected sections of device 105. These less protected sectors may be modified sometime after an initial integrity check. This may mean that the results of an integrity check for a device may change over time. For example, a device that passed its integrity check at boot-up may subsequently fail an integrity check after processing various data from other devices on the network. Therefore, certain devices may require subsequent integrity checks from certain other devices even though the other devices may already be admitted to the network.

In certain embodiments, device 510 may issue a certificate to the device 505 indicating a certain level of trust for device 505. If the embedded integrity value of device 510 matches the measured integrity value transmitted by device 505, then device 510 issues a certificate indicating that device 505 has a high level of trustworthiness. If the embedded integrity value of device 510 does not match the measured integrity value transmitted by device 505, device 510 may require device 505 to transmit diagnostic data. Based on the diagnostic data, device 510 may issue a certificate with an appropriate level of trust according to a policy. The level of trust may be associated with certain allowed types of processing on the data transmitted from device 505. Device 510 may also send the diagnostic data transmitted by device 505 to backend server 515. Based on the diagnostic data, backend server 515 may instruct device 510 to issue a certificate to device 505 indicating a level of trust.

Device 505 may present the certificate when attempting future communications with the device 510 such that device 510 may not require device 505 to perform a new integrity check the next time it attempts to communicate. In some embodiments, device 510 may keep the certificate in its own general storage. In these embodiments, device 510 may associate the certificate with an identifier transmitted by device 505. In particular embodiments, the certificate may expire after a specified amount of time. Even with the presence of a certificate, device 510 may require a new integrity check in certain circumstances. For example, device 510 may require device 505 to perform another integrity check and send its measured integrity value if the type of data that device 505 is attempting to send is of a critical nature. The use of certificates, in certain embodiments, may require device 510 to retain and manage certificates of the device 505 and other devices not shown in FIG. 5. Certain embodiments of a system 500 may forego the use of certificates and, instead, require the transmitting device to submit to an integrity check each time it attempts to communicate. In some embodiments, the decision to use certificates rather than require the transmitting device submit to an integrity check for each communication may be uniform for certain sections of the network. For example, all devices under the same gateway may either issue certificates or require transmission of a measured integrity value before each communication.

Several possibilities for transmitting and receiving data among components of a network may arise given the conditions discussed in this disclosure. For example, meter data may be allowed to pass through the network without checking the transmitting device's integrity, however, all attempts to transmit management or control data may require either a valid certificate or successful integrity authentication.

In certain embodiments, device 505 may attempt to transmit data to device 510 that was transmitted to device 505 from another device not shown in FIG. 5. In some embodiments, device 510 may determine that device 505 was not the original source of the data. Device 510 may request that the device that transmitted the data to device 505 perform an integrity check and send its measured integrity value to device 510. Device 510 may compare this value to its own embedded integrity value and then process the data depending on the results of the comparison. Note that the device that transmitted the data to device 505 may not be the "original" source of the data. Device 510 may request an integrity check from any device in the chain of devices used to route a communication to device 510. In certain embodiments, the originating device may transmit its measured integrity value with any data that it sends over the network of devices. As such, device 510 may possess the measured integrity value of the originating device when it receives the transmission of data from device 505. In some embodiments, device 510 may have a policy that requires it to compare its embedded integrity value to the measured integrity value of the device it receives the data from directly and the device that sent the data originally. Backend server 515 may also instruct device 510 as to which devices it should request integrity checks from.

In some embodiments, the embedded integrity values of all devices in a network of devices are configured to be the same. The measured integrity values of certain devices may be different, however, under varying circumstances. For instance, a new neighborhood in a city may have new devices configured such that their measured integrity values do not match the embedded integrity values of the other devices in the city. In this situation, the new devices in the new neighborhood may properly have different measured integrity values even though they have not otherwise been compromised. In this situation, one of the other devices may contact the backend server to determine what policy to apply to data coming from one of these new devices in accordance with the discussion above.

All of the options discussed regarding integrity checks for one device with respect to FIG. 2 are also available when a first device attempts to communicate with a second device. For example, device 505 and device 510 may be configured with multiple embedded integrity value registers. When device 505 attempts to communicate with device 510, device 510 may compare the measured integrity value of device 505 against one or more of the values stored in the embedded integrity value registers of device 510. In some embodiments, device 505 may have multiple measured integrity values based on various formulas. Device 510 may compare each measured integrity value of device 505 to the one or more embedded integrity values of device 510. Device 510 may have policies that provide different instructions depending on the results of the various comparisons similar to those described with respect to device 105 of FIG. 2.

Figure 6:
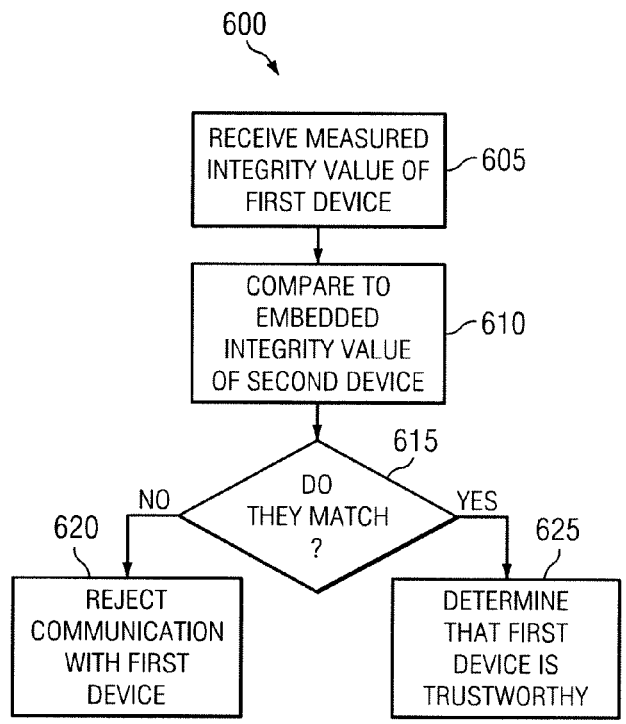
FIG. 6 illustrates an example embodiment of a method to allow a second device to determine a level of trust for a first device.

FIG. 6 illustrates an embodiment of a method 600 operable to allow a second device to determine a level of trust of a first device that is attempting to communicate with the second device. The method begins at step 605 where a second device receives the measured integrity value of the first device. In step 610, the second device compares its embedded integrity value to the measured integrity value transmitted by the first device. In step 615, a determination is made as to whether the two values match. If the two values do not match, then in step 620 the second device may determine the first device to be untrustworthy, and the communication with the first device may be rejected. If the method determines that the values do match, then at step 625 the second device determines that the first device is trustworthy and continues with the communication from the first device.

One of skill in the art will recognize that the method 600 could include various other steps. For example, the method 600 could include steps that determine different levels of trustworthiness for the first device depending on the measured integrity value of the first device. Depending on the level of trustworthiness, the second device may process the data according to the policy stored on the device. In the event that the measured integrity value of the first device does not match the embedded integrity value of the second device, the second device may request that the first device transmit more information or diagnostic data. This information may include the first device's identifier, one or more intermediate measured values of the first device, and any other information that may assist the second device in determining a level of trust to assign to the first device. This information may guide the second device in determining how to process the data transmitted from the first device in accordance with its policy. In some embodiments, the method may require that the second device contact a backend server. The second device may transmit information or diagnostic data from the first device to assist the backend server in determining the level of trust to assign to the first device.

Figure 7:
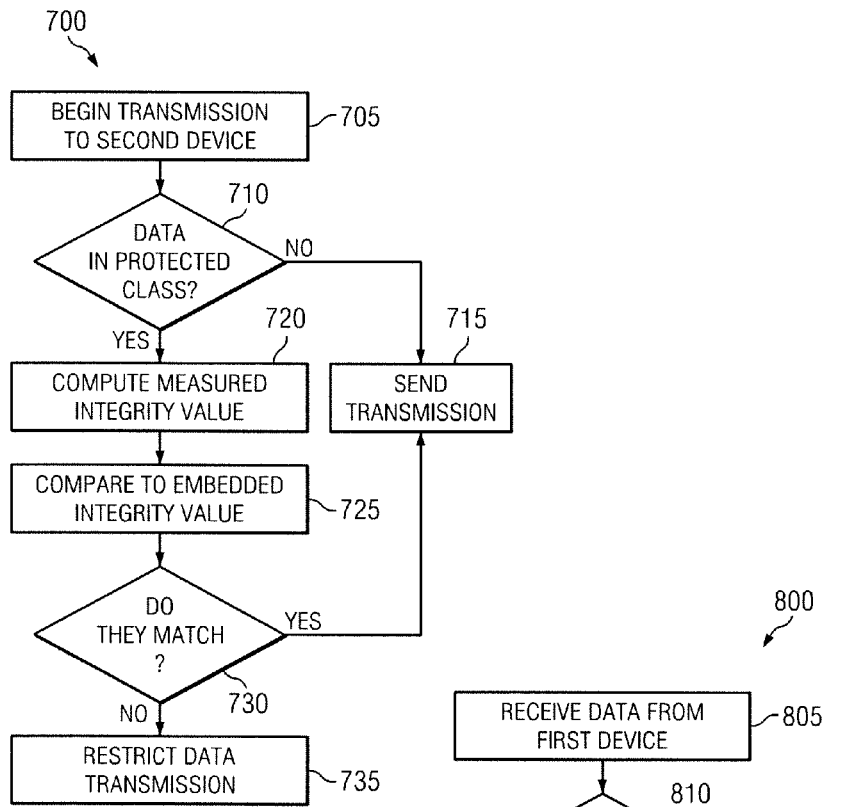
FIG. 7 illustrates an example embodiment of a method involved in transmitting data from the first device to the second device.

FIG. 7 illustrates an embodiment of a method 700 operable to facilitate application of a policy associated with transmitting data from a first device to a second device. The method begins at step 705 where the first device attempts to send data to a second device. At step 710, a determination is made as to whether at least a portion of the data that first device is attempting to send is in a protected class. Data may be in a protected class if it corresponds to more critical data. In some embodiments, management data and/or control data may be in a protected class while metering data is unprotected. If no portion of the data is in a protected class, the method continues with step 715 where first device continues its attempt to send data to the second device.

If the determination is made that at least a portion of that data that the first device seeks to transmit is in a protected class, then the method continues with step 720 where the measured integrity value of the first device is determined. Step 720 may have similar steps as those listed for method 305 depicted in FIG. 4. In step 725, the measured integrity value of the first device is compared to the embedded integrity value of the first device. In step 730, a determination is made as to whether the embedded integrity value of the first device matches the measured integrity value of the first device. If the values do match, the method continues with step 715 where the first device continues its attempts to send the data to the second device. If the method determines that the values do not match, the method continues with step 735 where the data transmission is restricted in accordance with a policy. This restriction may be that the data is not sent at all or that a limited amount of data is sent in the transmission. For example, the first device may continue its attempts to send the non-protected portion of the data. In some embodiments, method 700 may attempt to contact the backend server for further instruction. The first device may send information and/or diagnostic data to the backend server to assist the backend server in determining whether the first device should continue its attempts to transmit the data to the second device.

Figure 8:
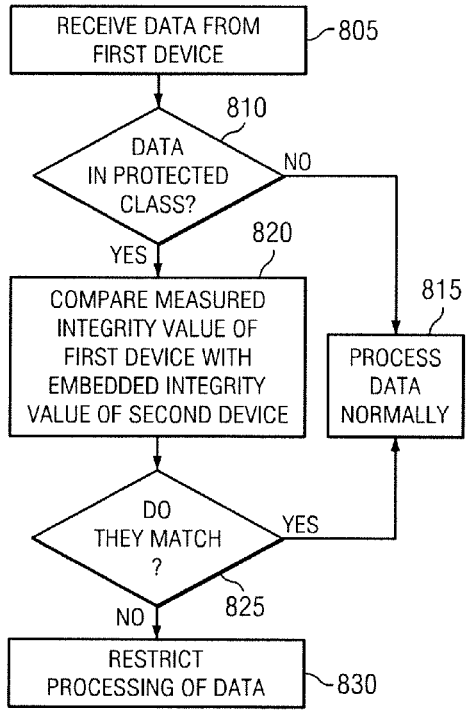
FIG. 8 illustrates an example embodiment of a method involved in receiving data at the second device from the first device.

FIG. 8 illustrates an embodiment of a method 800 operable to facilitate application of a policy associated with receiving data on a second device from a first device. The method begins at step 805 where the second device receives data from a first device. In step 810, a determination is made as to whether at least a portion of the data received from the first device is in a protected class. If the determination is made that no portion of the data is in a protected class, the method continues with step 815 where the second device will process the data from the first device in a normal manner according to its policy.

If the determination is made in step 810 that at least a portion of the data is in a protected class, then the method continues with step 820. In step 820 the measured integrity value of the first device is compared with the embedded integrity value of the second device. If the first device did not initially send its measured integrity value with its initial transmission of data, then the second device may request the first device's measured integrity value at this time. In step 825, a determination is made as to whether the value of the measured integrity value of the first device matches the embedded integrity value of the second device. If the values match, then the method continues with step 815 where the data transmitted from the first device is processed by the second device in a normal manner. If the determination is made in step 825 that the values do not match, then the method continues with step 830 where the processing of the data transmitted from the first device is restricted in accordance with the policy of the second device. In certain embodiments, the second device may contact the backend server to determine what processing it should allow on the data transmitted from the first device. The second device may send information and/or diagnostic data of the first device to the backend server to assist the backend server in determining whether the second device should restrict the processing of the data sent by the first device.

Modifications, additions, or omissions may be made to the methods disclosed herein without departing from the scope of the invention. The methods may include more, fewer, or other steps. For example, method 800 may include the step of requesting from the first device one or more intermediate measured values. The policy applied to the data sent from the first device may depend on one or more of these intermediate measured values. Additionally, steps may be performed in any suitable order.

Modifications, additions, or omissions may be made to the systems and apparatuses disclosed herein without departing from the scope of the invention. The components of the systems and apparatuses may be integrated or separated. For example, gateways 110 may be condensed into one gateway 110. Moreover, the operations of the systems and apparatuses may be performed by more, fewer, or other components. For example, the operations of communication processing module 215 and measuring processing module 220 may be performed by one component, or the operations of control processing module 205 may be performed by more than one component. Additionally, operations of the systems and apparatuses may be performed using any suitable logic comprising software, hardware, and/or other logic. As used in this document, "each" refers to each member of a set or each member of a subset of a set.

A component of the systems and apparatuses disclosed herein may include an interface, logic, memory, and/or other suitable element. An interface receives input, sends output, processes the input and/or output, and/or performs other suitable operation. An interface may comprise hardware and/or software.

Logic performs the operations of the component, for example, by executing instructions to generate output from input. Logic may include hardware, software, and/or other logic. Logic may be encoded in one or more tangible media and may perform operations when executed by a computer. Certain logic, such as a processor, may manage the operation of a component. Examples of a processor include one or more computers, one or more microprocessors, one or more applications, and/or other logic.

In particular embodiments, the operations of the embodiments may be performed by one or more computer readable media encoded with a computer program, software, computer executable instructions, and/or instructions capable of being executed by a computer. In particular embodiments, the operations of the embodiments may be performed by one or more computer readable media storing, embodied with, and/or encoded with a computer program and/or having a stored and/or an encoded computer program.

A storage unit, a repository, and a register each may comprise memory. A memory stores information. A memory may comprise one or more non-transitory, tangible, computer-readable, and/or computer-executable storage media. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A method of device integrity authentication, comprising:
   retrieving a list of two or more sectors for a device, each sector being associated with a respective sector value;
   measuring an initial integrity value of the device based on one or more of the respective sector values;
   updating the initial integrity value based on the other sector values of the two or more sectors;
   obtaining one or more intermediate measured integrity values based on the updating;
   storing the one or more intermediate measured integrity values;
   determining, using a processor, a final measured integrity value of the device from the one or more intermediate measured integrity values;
   comparing, using the processor, the final measured integrity value to an embedded integrity value maintained in the device;
   retrieving one or more of the intermediate measured integrity values in response to the final measured integrity value not matching the embedded integrity value; and
   facilitating, using the processor, application of a policy to the device using the final measured integrity value or the one or more intermediate measured integrity values based on the comparing;
   wherein each sector corresponds to a processing module of the device.

2. The method of claim 1, further comprising calculating a sum of the one or more sector values of the device.

3. The method of claim 1, further comprising:
   determining an intermediate measured value based on a subset of a plurality of sector values used to determine the final measured integrity value;
   storing the intermediate measured value;
   facilitating, using the processor, application of a policy to the device based on the intermediate measured value.

4. The method of claim 1, further comprising storing at least one of the embedded integrity value and the policy in a protected section of the device.

5. The method of claim 1, further comprising basing at least one of the policies on an identifier of the device.

6. The method of claim 5, wherein the identifier is unique to the device.

7. The method of claim 1, wherein the policy comprises any of enabling, not disabling, disabling, and not enabling one or more features of the device depending on whether the final measured integrity value matches or does not match the embedded integrity value.

8. The method of claim 1, wherein the policy comprises transmitting information to a backend server.

9. The method of claim 8, wherein the information comprises at least one of the final measured integrity value, an identifier of the device, and an intermediate measured value, wherein an intermediate measured value is based on a subset of a plurality of sector values used to determine the final measured integrity value.

10. The method of claim 8, further comprising:
    receiving a device policy from the backend server, wherein the device policy is determined according to the information transmitted to the backend server; and
    applying the device policy to the device.

11. The method of claim 1, further comprising
    determining the final measured integrity value in response to one of a predetermined schedule and a request from outside of the device.

12. The method of claim 1, wherein the final measure integrity value is based on any one or more of time of day, amplitude of ambient light around the device, ambient temperature around the device, proximity of the device to a gateway or backend server, and an amount of meter usage.

13. A device for performing integrity authentication, comprising:
    an integrity check processor operable to:
      retrieve a list of two or more sectors for a device, each sector being associated with a respective sector value;
      measure an initial integrity value of the device based on one or more of the respective sector values;
      update the initial integrity value based on the other sector values of the two or more sectors;
      obtain one or more intermediate measured integrity values based on the updating;

store the one or more intermediate measured integrity values;

determine a final measured integrity value of the device from the one or more intermediate measured integrity values;

compare the final measured integrity value to an embedded integrity value of the device; and retrieve one or more of the intermediate measured integrity values in response to the final measured integrity value not matching the embedded integrity value; and a control processor operable to facilitate application of one of a plurality of policies to the device using the final measured integrity value or the one or more intermediate measured integrity values based on the compare;

wherein each sector corresponds to a processing module of the device.

14. The device of claim 13, wherein the integrity check processor is operable to calculate a sum of one or more sector values of the device.

15. The device of claim 13, wherein the integrity check processor is operable to determine an intermediate measured value based on a subset of a plurality of sector values used to determine the final measured integrity value, store the intermediate measured value, and facilitate application of a policy to the device based on the intermediate measured value.

16. The device of claim 13, wherein the control processor is operable to store at least one of the embedded integrity value and the policy in a protected section of the device.

17. The device of claim 13, wherein at least one of the policies is based on an identifier of the device.

18. The device of claim 17, wherein the identifier is unique to the device.

19. The device of claim 13, wherein at least one policy comprises any of enabling, not disabling, disabling, and not enabling one or more features of the device depending on whether the final measured integrity value matches or does not match the embedded integrity value.

20. The device of claim 13, wherein at least one policy comprises transmitting information to a backend server.

21. The device of claim 20, wherein the information comprises at least one of the final measured integrity value, an identifier of the device, an intermediate measured value, wherein an intermediate measured value is based on a subset of a plurality of sector values used to determine the final measured integrity value.

22. The device of claim 20, wherein the control processor is operable to receive a device policy from the backend server, wherein the device policy is determined according to the information transmitted to the backend server, the control processor operable to apply the device policy to the device.

23. The device of claim 13, wherein the integrity check processor is operable to determine the final measured integrity value in response to one of a predetermined schedule and a request from outside of the device.

24. The device of claim 13, wherein the final measure integrity value is based on any one or more of time of day, amplitude of ambient light around the device, ambient temperature around the device, proximity of the device to a gateway or backend server, and an amount of meter usage.

* * * * *